US010821888B2

(12) United States Patent
Kidakarn et al.

(10) Patent No.: US 10,821,888 B2
(45) Date of Patent: Nov. 3, 2020

(54) CUSTOMIZABLE AND ILLUMINATED LICENSE PLATE FRAME

(71) Applicant: CAR CHARMS, INC., Hermosa Beach, CA (US)

(72) Inventors: Michael Kidakarn, Lawndale, CA (US); Gilbert Romero, Lawndale, CA (US)

(73) Assignee: CAR CHARMS, INC, Hermosa Beach, CA (US)

( * ) Notice: Subject to any disclaimer, the term of this patent is extended or adjusted under 35 U.S.C. 154(b) by 0 days.

(21) Appl. No.: 16/659,450

(22) Filed: Oct. 21, 2019

(65) Prior Publication Data

US 2020/0122635 A1 Apr. 23, 2020

Related U.S. Application Data

(60) Provisional application No. 62/747,879, filed on Oct. 19, 2018.

(51) Int. Cl.
*B60Q 1/56* (2006.01)
*B60R 13/10* (2006.01)
*B60R 13/01* (2006.01)

(52) U.S. Cl.
CPC .............. *B60Q 1/56* (2013.01); *B60R 13/105* (2013.01); *B60R 2013/015* (2013.01)

(58) Field of Classification Search
CPC ................................ B60Q 1/56; B60R 13/105
See application file for complete search history.

(56) References Cited

U.S. PATENT DOCUMENTS

| | | | | |
|---|---|---|---|---|
| 3,304,642 A * | 2/1967 | Dardis | ................ | B60R 13/105 40/209 |
| 5,870,841 A * | 2/1999 | Brody, II | .............. | B60R 13/105 40/200 |
| 5,983,539 A * | 11/1999 | Martin | .................... | G09F 7/002 40/201 |
| 6,027,235 A * | 2/2000 | Chen | ....................... | B60Q 1/56 362/497 |
| 7,350,323 B1 * | 4/2008 | Basos | ..................... | B60R 13/10 40/209 |
| 8,291,627 B1 * | 10/2012 | Spencer | ................ | B60R 13/005 40/209 |
| 9,283,889 B1 * | 3/2016 | Baker | .................. | B60Q 1/2661 |
| 9,914,410 B1 * | 3/2018 | Knox | .................... | B60R 13/105 |
| 10,220,801 B1 * | 3/2019 | Spencer | ............... | B60R 13/105 |
| 2003/0079381 A1 * | 5/2003 | Arens | ................... | B60R 13/005 40/210 |

* cited by examiner

*Primary Examiner* — Gary C Hoge
(74) *Attorney, Agent, or Firm* — Elizabeth Yang

(57) ABSTRACT

A customizable and illuminated license plate frame, the frame includes a perimeter section having a receiving cavity for receiving a license plate of a vehicle; a second frame member pivotably connected with the perimeter section and having an opening and a plurality of fastening apertures arranged around the opening; a translucent panel detachably coupled on the opening of the second frame member and operable to press against the license plate; at least one hinge operational between the perimeter second and the second frame member; a plurality of tiles detachably attached on the fastening apertures of the second frame member; and a plurality of LED light arranged on the second frame member to illuminate the tiles and the license plate.

18 Claims, 6 Drawing Sheets

CUSTOMIZABLE AND ILLUMINATED LICENSE PLATE FRAME

CROSS-REFERENCE TO RELATED APPLICATIONS

This application claims priority to and is a provisional patent application No. 62/747,879, filed on Oct. 19, 2018, which is hereby incorporated by reference in their entirety.

FIELD OF THE DISCLOSURE

The present disclosure relates to a customizable and illuminated license plate frame. More so, a license plate frame is configured to hold and secures a license plate to the bumper of a vehicle, while also providing a surface for detachable attachment of a plurality of tiles having myriad shapes and designs.

BACKGROUND OF THE DISCLOSURE

Generally, license plate frames are widely used to hold the license frame and provide more anesthetic effects to the license plate. Conventionally, the license plate frame comprises pre-designed images, words, or indicias printed thereon. Therefore, in order to perform a variety of anesthetic effects, customers need to purchase many license plate frames to satisfy their needs. Other optional license plate frames comprise at least one illumination device to provide illuminating effects on the license plate. However, the illumination device also pre-embedded on the license plate frame, so the customers still need to purchase many license plate frames to achieve various lighting performance.

Although the license plate frame can provide various styles of lighting effect through a pre-programmed software embedded on the license plate, the cost for manufacturing this kind of license plate frame are relatively higher. In other words, the electric power to operate the pre-programmed software is also relatively higher, so the above-mentioned illumination license plate frame is required to be frequently charging. Therefore, most of the users are easy to lose their patients to charge their license plate frames.

Therefore, there may exist a desire to develop a license plate frame with a plurality of anesthetic surfaces which allow a myriad of choices of decoration pieces being detachably arranged thereon.

BRIEF SUMMARY OF THE DISCLOSURE

In a general implementation, a customizable and illuminated license plate frame includes a perimeter section comprising a receiving cavity for receiving a license plate of a vehicle; a second frame member pivotably connected with the perimeter section and comprising an opening and a plurality of fastening apertures arranged around the opening; a translucent panel detachably coupled on the opening of the second frame member and being operable to press against the license plate; at least one hinge operational between the perimeter second and the second frame member; a plurality of tiles detachably attached on the fastening apertures of the second frame member; and a plurality of LED light arranged on the second frame member to illuminate the tiles and the license plate.

In another aspect combinable with the general implementation, at least one of the tile is selected from a group consisting of letters, numerals, indicia, punctuation marks, symbols, phrases, images, logos, shapes, electronic parts, motors, and LED lights.

In another aspect combinable with the general implementation, at least one of the second frame member comprises at least one elongated receiving slot to receive at least one LED light board to provide various light effects.

In another aspect combinable with the general implementation, at least one of the perimeter section comprises a first opening and at least two fastening holes to receive at least one screw be locked thereon.

In another aspect combinable with the general implementation, each of the tiles comprises at least one fastening member which can be locked with the fastening apertures to attach the tiles on the fastening apertures of the second frame member.

In another aspect combinable with the general implementation, the fastening members are resilient, wherein the fastening members can deform to insert through the fastening apertures and reinstate the original shape to lock on the fastening apertures.

In another aspect combinable with the general implementation, the license plate frame further comprises a control program wirelessly communicated with a remote device, wherein the control program is electrically communicated with the LED light board to control the light effects.

In another aspect combinable with the general implementation, the license plate frame further comprises at least one speaker electrically connected to the control program, wherein the remote device can control the speakers through the control program.

In another aspect combinable with the general implementation, the license plate frame further comprises a solar panel operatively connected to the control program and LED lights with electric wires so as to provide the electricity thereto.

Another aspect of the embodiment is directed to methods of decorating a license plate frame with a license plate, wherein the method comprises:

opening the license plate frame and placing the license plate between a perimeter section and a second frame member;

providing a plurality of fastening apertures on the second frame member;

attaching at least one tiles on the fastening apertures of the second frame member;

providing a plurality of LED lights on the second frame member;

providing at least one elongated slot on the second frame member to receive at least one LED light board;

providing an opening on the second frame member;

providing at least one translucent panel detachably coupled on the opening of the second frame member;

controlling the LED lights and the LED light board by a control program; and controlling the control program via an application installed on a remote device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example, operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to a precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
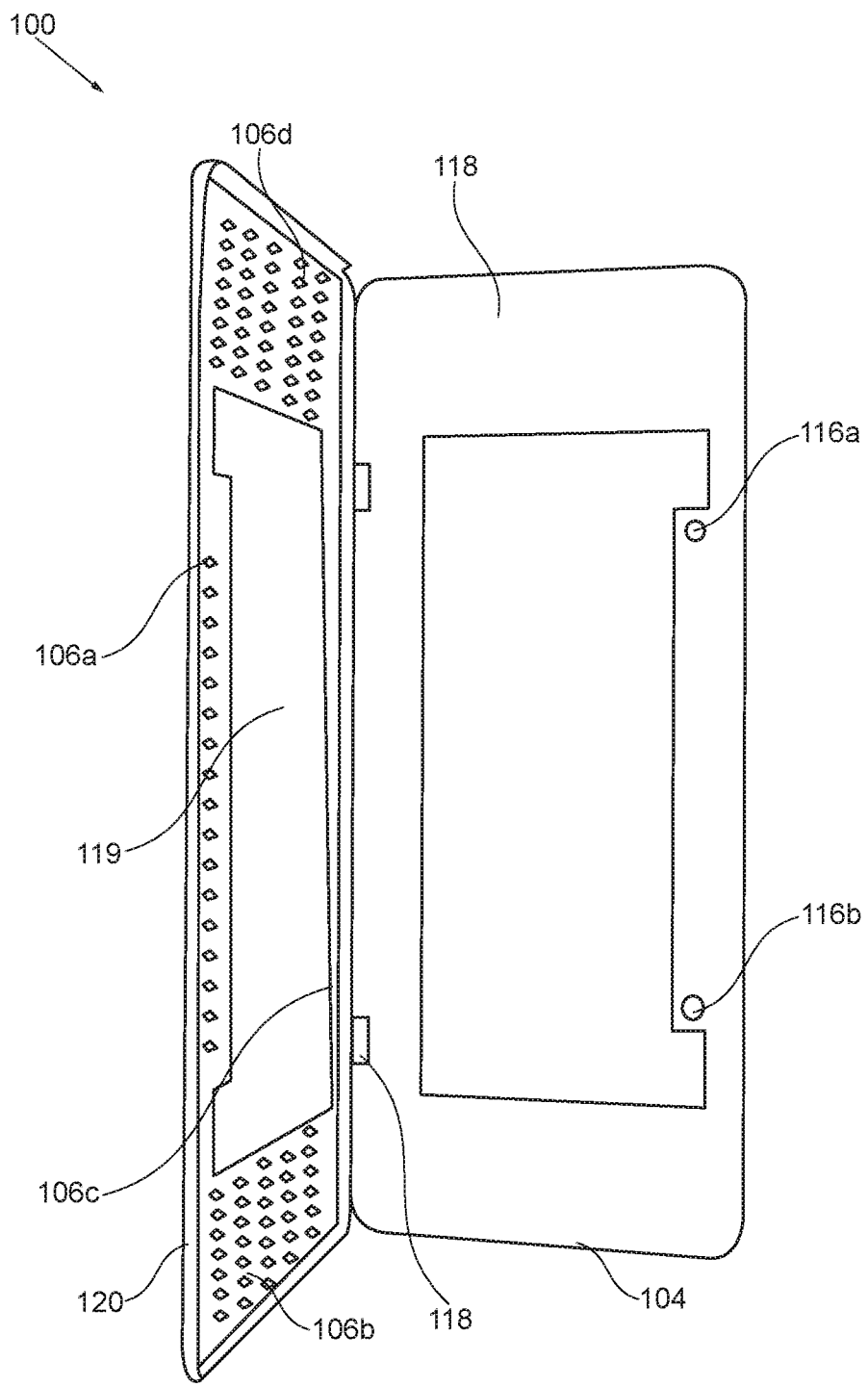
FIG. 1 is a front view of an embodiment of a customizable and illuminated license frame according to an aspect of the embodiment.

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2:
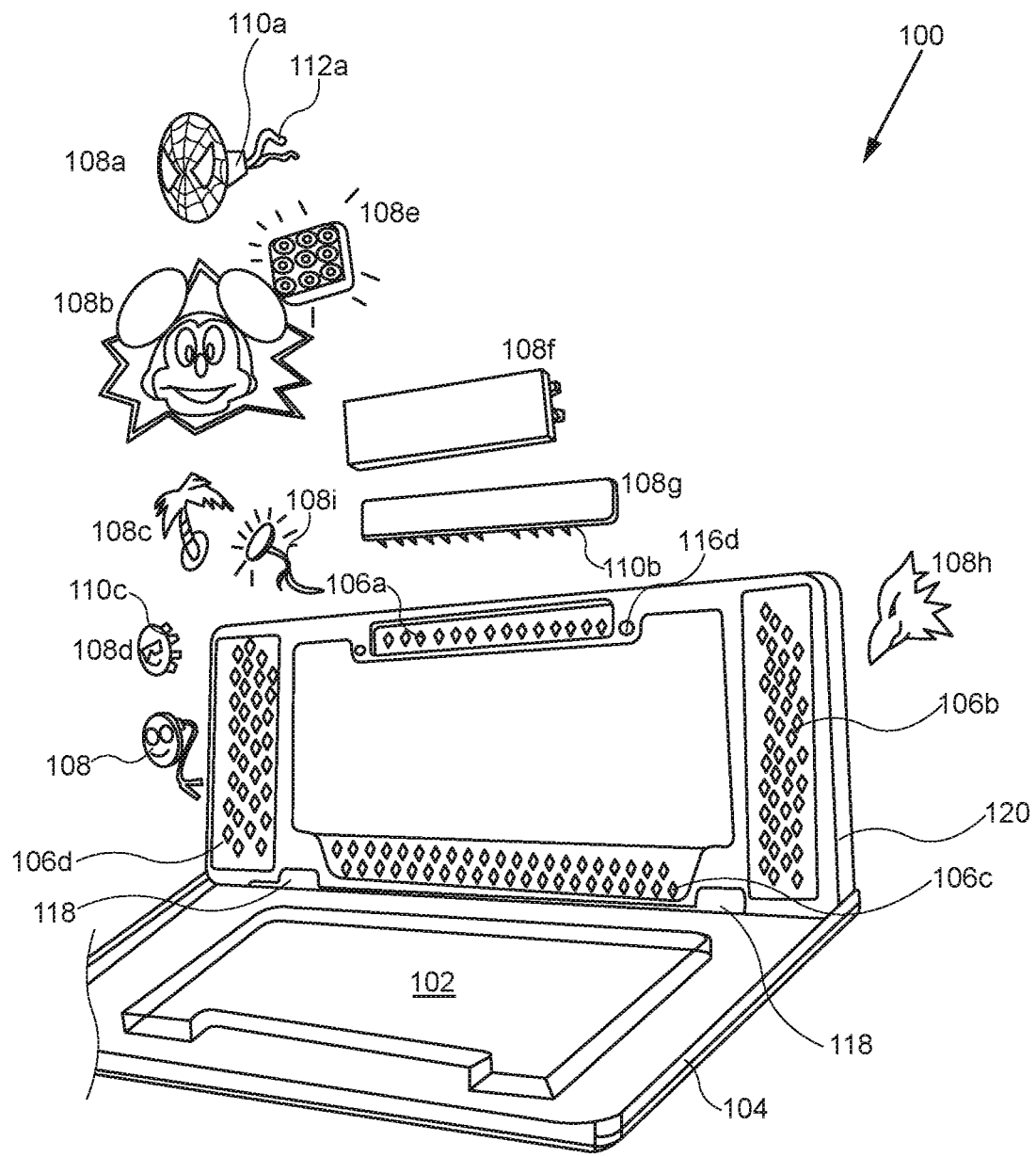
FIG. 2 is a front view of the customizable and illuminated license frame having a plurality of tiles which can be detachably attached thereon.
Figure 3:
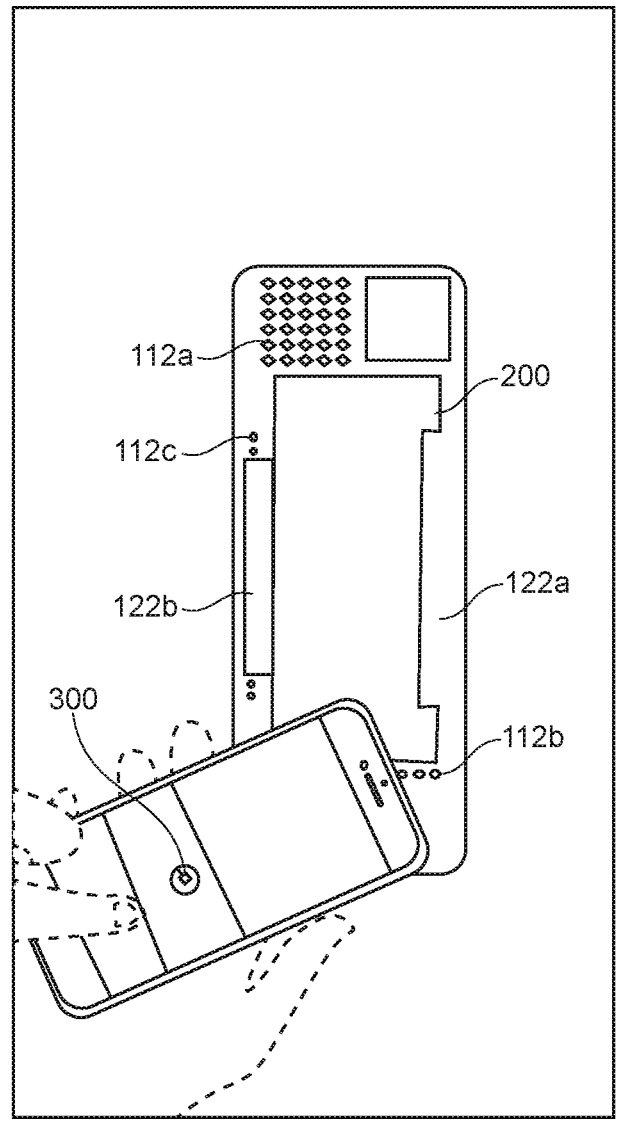
FIG. 3 is a perspective view of the customizable and illuminated license frame wirelessly communicated with a remote device.

In one embodiment of the present invention presented in FIGS. 1-3, a customizable and illuminated license plate frame 100 is configured to hold and secures a license plate 200 to the bumper of a vehicle, while also providing a surface for detachable attachment of a plurality of tiles 108a-h having myriad shapes and designs customizable by a user for display from near the license plate of the vehicle.

In one embodiment, the license plate frame 100 may comprise at least one translucent panel 102 that presses against the license plate 200 to hold vehicle registration decals against the license plate. The translucent panel 102 that presses against the paper material license plate to securely hold and protect the paper license plate. The contemplate license plate 200 can be made of any suitable materials to be pressed against by the translucent panel 102, so that the license plate 200 can be held and protected underneath the translucent panel. It should be understood that the above-described materials of license plate 200 are exemplary and any other materials can be adopted in various embodiments of this disclosure.

The license plate frame 100 also comprises a perimeter section 104 having a receiving cavity 105 to receive the license and that secures the license plate 200 to the vehicle bumper, and a second frame member 120 having an opening 119 and being pivotably coupled with the perimeter section 104 to carry the translucent panel 102, wherein the translucent panel 102 is detachably coupled on the opening 119 of the second frame member 120. In other words, the license plate 200 is sandwiched between perimeter section 104 and the second frame member 120.

Accordingly, the second frame member 120 comprises a plurality of fastening apertures 106a-d spacedly arranged around the opening 119, a first fastening hole 116a, and a second fastening hole 116b, wherein the fastening apertures 106a-d are selected from a group consisting of a diamond shape, a honeycomb shape, and a crisscross shape.

In another embodiment, the perimeter section 104 comprises a first opening 123, a third fastening hole 116c, and a fourth fastening hole 116d, wherein the first fastening hole 116a is aligned with the third fastening hole 116c, and the second fastening hole 116b is aligned with the fourth fastening hole 116d. In this manner, one screw may be passed through the first and third fastening hole 116a, 116c, and the other screw may be passed through the second and fourth fastening hole 116b, 116d, so as to attach the perimeter section 104 and the second frame member 120 on the vehicle bumper. In this manner, the translucent panel 102 may be coupled on the first opening 123, so a front face of the license plate (the face with the vehicle number) may be exposed either through the opening 119 of the second frame member 120 or the first opening 123 of the perimeter section 104.

In one aspect, the translucent panel 102 can be detached to clean the license plate 200. In other words, the translucent panel 102 can be attached to the opening 119 or the first opening 123, and the registration decals can be attached on the license plate 200 with the translucent panel 102 protected thereon.

In addition, the license plate frame 100 further comprises at least one hinges 118 operationally arranged between the perimeter section 104 and the second frame member 120.

In another aspect, each of the tiles 108a-h comprises at least one fastening member 110a-c that fits into the fastening apertures 106a-d in a snap-fit relationship, wherein each of the tiles 108a-h provides the customizable indicia that detachably attach to the second frame member 120. The tiles 108a-h may be positioned and secured, individually or in groups of tiles 108a-h, within the fastening holes 106a-d of the perimeter section 104 to achieve a desired arrangement.

In yet another aspect, each of the fastening members 110 is resilient, and thus may be slightly inwardly compressed for insertion into the fastening aperture 106a-d on the second frame member 120. In other words, the fastening member 110a-c may be deformed to pass through the fastening aperture 106a-d, and then be reinstated to its original shape to lock on the fastening apertures 106a-d. In addition, each of the tiles 108a-h is positioned horizontally with the second frame member 120, and when an outward pressure is exerted on the fastening members 110a-c, the fastening members 110a-c may be deformed to pass through the fastening aperture 106a-d, so as to detach the tiles 108a-h from the second frame member 120.

Accordingly, each of the tiles 108a-h is selected from a group consisting of letters, numerals, indicia, punctuation marks, symbols, phrases, images, logos, shapes electronic parts, motors, and LED lights.

Figure 5:
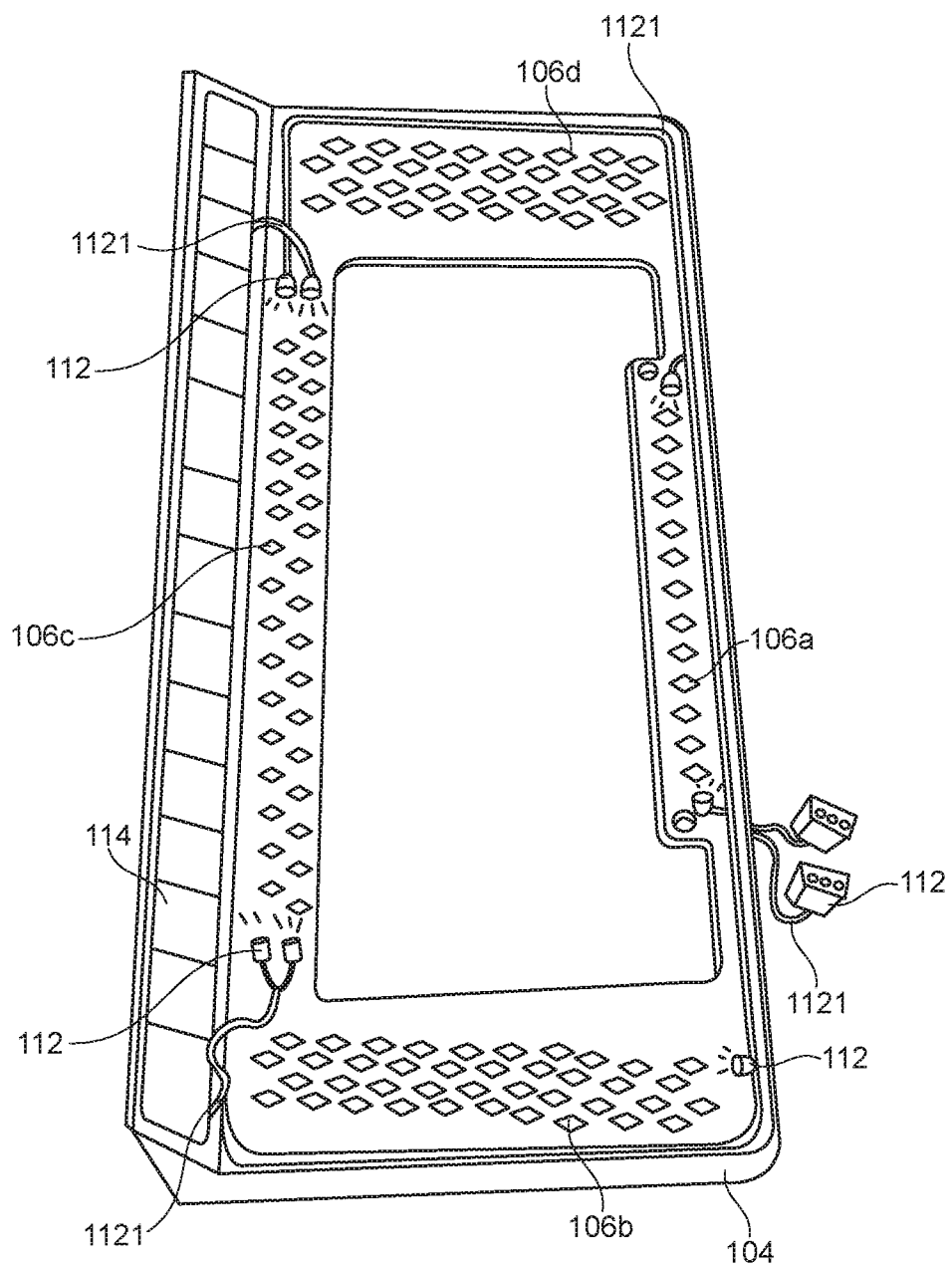
FIG. 5 is a perspective view of the customizable and illuminated license frame illuminating LED lights arranged thereon.

Referring to FIG. 3, and FIG. 5 of the drawings, in yet another embodiment, the license plate frame 100 further comprises a plurality of LED lights 112 arranged on the second frame member 102, wherein the LED lights 112 are inclinedly arranged and directed to the fastening apertures 106a-d, so when the tiles 108a-h are attached on the fastening apertures 106a-d, the tiles 108a-h can be illuminated by the LED lights 112.

As shown further in FIG. 5, the LED lights 112 may be arranged on the top of the fastening apertures 106b to illuminate the tiles 108a-h attached thereon. In other words, the LED lights 112 may be arranged on two sides of the fastening apertures 106a, 106c to illuminate the tiles 108a-h attached thereon. Accordingly, the electric wires 1121 may be adapted to connect the LED lights 112 and arranged around a periphery of the second frame member 102.

As shown further in FIG. 5, the license plate frame 100 further comprises a solar panel 114 arranged adjacent to a bottom edge of the second frame member 120, wherein the electric wires 1121 may be connected with the solar panel 114 and the LED lights 112, wherein the solar panel 114 can generate the electricity for powering the LED lights 112 through the electric wires 1121.

Figure 4:
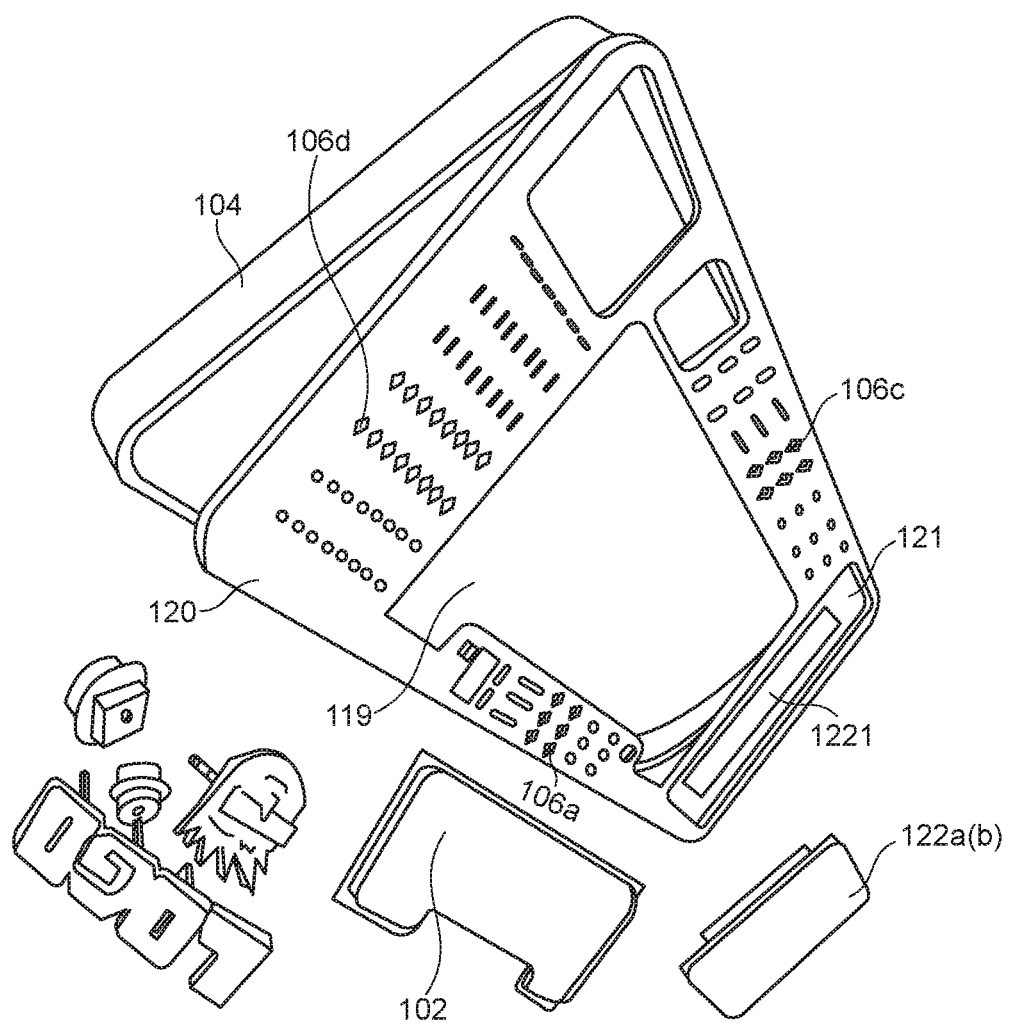
FIG. 4 is a perspective view of the customizable and illuminated license frame according to the aspect of the embodiment.

Referring now to the detail of FIG. 4, in still yet another embodiment, the second frame member 102 further comprises at least one elongated receiving slot 121 and at least one LED light board 122a-b selectively attached on the elongated receiving slot 121 to provide various light effects, wherein the second frame member 120 and the LED light boards 122a-b are both made of magnetic substances, such as magnet, so the LED light boards 122a-b can be naturally attached on the second frame member 102.

In one aspect, each of the elongated receiving slot 121 further comprises a magnetic substances 1221 attached thereon, wherein the LED light boards 122a-b may be attached to the elongated receiving slot 121 through the magnetic substances 1221. Therefore, in this manner, the second frame member 120 may be made of other non-magnetic substances, such as plastic, wood, or glass for aesthetic satisfaction.

Figure 6:
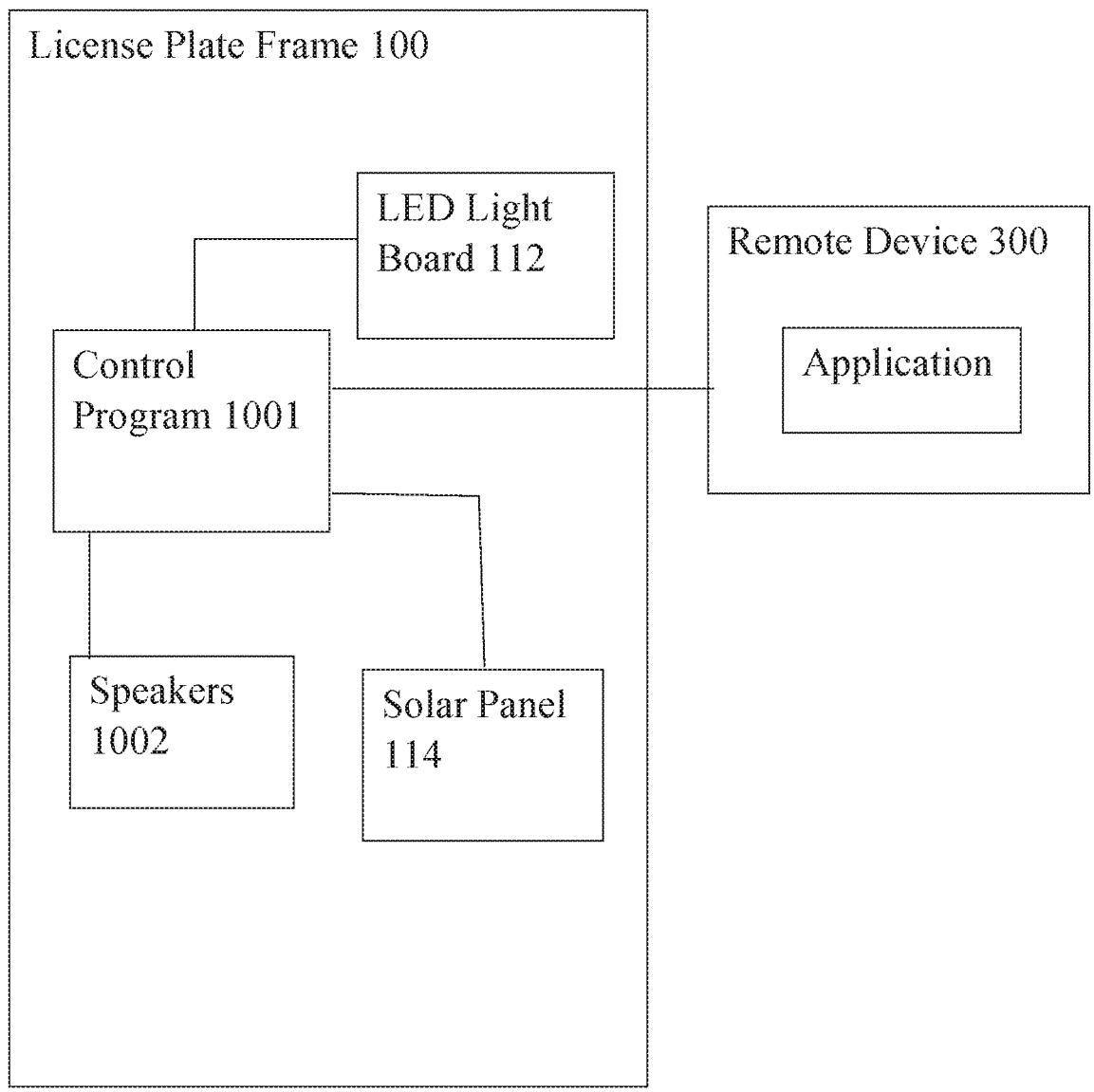
FIG. 6 is a block diagram of the customizable and illuminated license frame illuminating a control program being communicated with the remote device.

FIG. 6 generally depicts a block diagram of a system to control light effects and sound effects of the license plate frame 100 in accordance with one of the disclosed embodiments.

The license plate frame 100 further comprises a control program 1001 wirelessly connected to an application installed on the remote device 300, and at least one speakers 1002 electrically connected to the control program 1001 to provide sound effects, wherein the control program 1001 further electrically communicates with the LED light boards 122a-b, the solar panel 114, and the LED lights 112. Therefore, in this manner, the remote device 300 may be operated to control the sound effects provided by the speakers 1002 and the light effects provided by the LED light boards 122a-b and the LED lights 112 via the control program 1001. In addition, the control program 1001 can be powered by the solar panel 114.

In one aspect, the remote device 300 may be a remote computer, smartphone, tablet, or PDA device. It should be understood that the above-described devices are exemplary, and any other devices can be adopted in various embodiments of this disclosure.

In another aspect, the translucent panel 102 may be made of polycarbonate plastic, wherein the translucent panel 102 is rectangular shaped or shaped to cover on the license plate 200. In this manner, the translucent panel 102 holds vehicle registration decals against the license plate 200 to prevent them from falling off. In addition, the translucent characteristic of the panel 102 allows for easy viewing of the license plate 200. Furthermore, the translucent panel 102 comprises translucent colors, color fades, textures, sheens, and markings.

The contemplated translucent panel 102 can be made of suitable materials to provide translucent characteristic. It should be understood that the above-described materials are exemplary, and any other materials can be adopted in various embodiments of this disclosure.

Those skilled in the art will recognize that vanity license plates provide a range of possibilities for personalization. For example, bumper stickers enable a vehicle operator to display the desired message from the rear or front bumper of the vehicle. Another way such customization may be accomplished is by using a customized license plate frame 100 to hold and secure the license plate of the vehicle. The present invention allows for customization and illumination of such license plate frames through the use of detachable tiles 108a-h, LED lights 112, and LED light boards 122 powered by the solar panel 114.

In one embodiment, the perimeter section 104 may be made of, without limitation, a polycarbonate plastic, polyurethane, PVC, aluminum, and a metal alloy.

In another embodiment, the fastening members 110a-c may be configured to operate as a rotatable threaded or magnetic relationship with the fastening hole 106a-d, so as to detachably attach the tiles 108a-h into the fastening holes 106a-d. This allows for easy and fast detachment and attachment of the tiles 108a-h to the perimeter section 104. The tiles 108a-h may include, without limitation, letters, numerals, indicia, punctuation marks, symbols, phrases, images, logos, shapes, electronic parts, motors, and LED lights.

This easy interchangeability of tiles 108a-h allows a user to express an opinion, display a message, or advertise a product or service. The user can change the type or arrangement of tiles 108a-h to change/customize the message displayed from the license plate frame 100. For example, a football sports team logo during football season, and display a basketball sports team logo on the same license plate frame 100 during basketball season.

Also, there is a need for a user to add individual letters to spell their name, group, or affiliation. This allows for displaying to other vehicles the user's group, affiliation, hobby, or interest that may lead to a growing relationship or expand common interests. Examples of common interest include sports teams, universities, alumni, firefighter support groups, and favorite animated or game characters.

As shown further in FIG. 3, the license plate frame 100 may comprise LED lights 112 that illuminate the tiles 108a-h and the license plate 200, wherein the LED lights 112 are oriented towards either the vehicle numbers of the license plate 200 or the tiles 108a-h to illuminate the tiles 108a-h and license plate 200 under the translucent panel 102. The LED lights 112 also can enhance the decorative appearance of the license plate frame 100 and license plate 200.

As shown further in FIG. 5, the LED lights 112 are powered by the solar panel 114 through the plurality of the electric wires 1121, wherein the electric wires 1121 may be white, colored, or flashes in an alternating pattern. In other words, the solar panel 114 is configured to power the LED lights, may be attached to the bottom edge of the second frame member 120, and the solar panel 114 may be inclinedly arranged and outwardly oriented to capture the sunlight.

The contemplated embodiment may include a method of decorating a license plate frame with a license plate, wherein the method comprises:

opening the license plate frame and placing the license plate between a perimeter section and a second frame member;

fastening a plurality of tiles on a plurality of fastening apertures on the second frame member;

providing a plurality of LED lights on the second frame member;

attaching a LED light board on an elongated slot of the second frame member;

coupling a translucent panel to an opening formed on the second frame member;

controlling light effects provided from the LED lights and the LED light board via a control program; and controlling the control program via an application installed on a remote device.

Accordingly, in the step of opening the license plate frame, the perimeter section and the second frame member are pivotably connected with each other.

The above-mentioned method further comprises a step of: powering the control program by a solar panel arranged adjacent to the second frame member, wherein the solar panel may be attached to the bottom edge of the second frame member and is oriented outwardly to capture the sunlight. In addition, the solar panel is able to provide the electricity to the control program, the LED lights, LED light boards, and the speakers.

In one embodiment, each of the tiles comprises at least one fastening members, wherein the step of attaching at least one tiles comprises steps of:

deforming the fastening members to pass through the fastening apertures;

reinstating the fastening members to lock on the fastening apertures.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of customizable and illuminated license frames have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalents within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims, therefore, include not only the combination of elements which are literally set forth but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A customizable and illuminated license plate frame, the frame comprising:
   a perimeter section comprising a receiving cavity for receiving a license plate on a vehicle;
   a second frame member pivotably connected with the perimeter section and comprising an opening and a plurality of fastening apertures arranged around the opening;
   a translucent panel detachably coupled on the opening of the second frame member and operable to press against the license plate;
   at least one hinge operational between the perimeter second and the second frame member;
   a plurality of tiles detachably attached on the fastening apertures of the second frame member; and
   a plurality of LED lights arranged on the second frame member to illuminate the tiles and the license plate.

2. The license plate frame, as recited in claim 1, wherein the tiles are selected from a group consisting of letters, numerals, indicia, punctuation marks, symbols, phrases, images, logos, shapes, electronic parts, motors, and LED lights.

3. The license plate frame, as recited in claim 2, wherein the second frame member further comprises at least one elongated receiving slot to receive at least one LED light board to provide various light effects.

4. The license plate frame, as recited in claim 3, wherein the perimeter section further comprises a first opening and at least two fastening holes to receive at least two screws be locked thereon.

5. The license plate frame, as recited in claim 4, wherein each of the tiles comprises at least two fastening members which can be locked with the fastening apertures.

6. The license plate frame, as recited in claim 5, wherein the fastening members are resilient, wherein the fastening members can deform to pass through the fastening apertures and reinstate the original shape to lock on the fastening apertures.

7. The license plate frame, as recited in claim 6, further comprising a control program wirelessly communicated with a remote device, wherein the control program is electrically communicated with the LED light board to control the light effects.

8. The license plate frame, as recited in claim 7, further comprising at least one speaker electrically connected to the control program, wherein the remote device can control the speakers through the control program.

9. The license plate frame, as recited in claim 8, further comprising a solar panel operatively connected to the control program and LED lights with electric wires, so as to provide the electricity thereto.

10. A method of decorating a license plate frame with a license plate, wherein the method comprises:
    opening the license plate frame and placing the license plate between a perimeter section and a second frame member;
    fastening a plurality of tiles on a plurality of fastening apertures on the second frame member;
    providing light effects from a plurality of LED lights arranged on the second frame member;
    coupling a translucent panel to an opening formed on the second frame member;
    controlling light effects provided from the LED lights via a control program;
    controlling the control program via an application installed on a remote device;
    controlling the LED lights by a control program; and
    controlling the control program via an application installed on a remote device.

11. The method of claim 10, further comprising a step of: attaching an LED light board on an elongated slot of the second frame member.

12. The method of claim 11, wherein the perimeter section and the second frame member are pivotably connected with each other.

13. The method of claim 12, further comprising a step of: powering the LED lights by a solar panel arranged adjacent to a bottom edge of the second frame member.

14. The method of claim 13, further comprising a step of: generating sound effects from a plurality of speakers electrically connected to the control program.

15. The method of claim 14, wherein the perimeter section comprises a receiving cavity to receive the license plate disposed therein.

16. The method of claim 15, wherein each of the tiles comprises at least one fastening member, wherein the step of attaching at least one tiles comprises steps of:
    deforming the fastening members to pass through the fastening apertures;
    reinstating the fastening members to lock on the fastening apertures.

17. The method of claim 16, wherein the second frame member is made of a magnetic substance, and the LED light board is a magnet to attach to the second frame member.

18. The method of claim 17, wherein the perimeter section comprises a first opening where the translucent panel can be coupled thereon.

* * * * *